(12) United States Patent
Kim et al.

(10) Patent No.: US 7,633,863 B2
(45) Date of Patent: Dec. 15, 2009

(54) APPARATUS AND METHOD FOR SCHEDULING DATA IN A COMMUNICATION SYSTEM

(75) Inventors: Jung-Won Kim, Seoul (KR); Chang-Soo Park, Seongnam-si (KR); Yoo-Seung Song, Yongin-si (KR); Hee-Kwang Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 447 days.

(21) Appl. No.: 11/489,015

(22) Filed: Jul. 19, 2006

(65) Prior Publication Data
US 2007/0058544 A1    Mar. 15, 2007

(30) Foreign Application Priority Data
Jul. 19, 2005    (KR)    .................. 10-2005-0065533

(51) Int. Cl.
*H04L 12/26* (2006.01)
(52) U.S. Cl. .................. 370/230; 370/395; 370/252
(58) Field of Classification Search ................. 370/230, 370/332, 252, 436, 329, 331, 400, 338, 401, 370/395; 709/245
See application file for complete search history.

(56) References Cited

U.S. PATENT DOCUMENTS

| | | | | |
|---|---|---|---|---|
| 6,115,390 | A  * | 9/2000 | Chuah | 370/443 |
| 6,452,915 | B1 * | 9/2002 | Jorgensen | 370/338 |
| 6,594,268 | B1 * | 7/2003 | Aukia et al. | 370/400 |
| 6,850,490 | B1 * | 2/2005 | Woo et al. | 370/230 |
| 6,948,000 | B2 * | 9/2005 | Desai et al. | 709/245 |
| 7,006,472 | B1 * | 2/2006 | Immonen et al. | 370/332 |
| 7,023,820 | B2 * | 4/2006 | Chaskar | 370/329 |
| 7,266,087 | B2 * | 9/2007 | Wahl | 370/252 |
| 7,302,264 | B2 * | 11/2007 | Yoon et al. | 455/436 |
| 7,336,953 | B2 * | 2/2008 | Kim et al. | 455/438 |
| 7,457,267 | B1 * | 11/2008 | O'Neill | 370/331 |
| 2002/0119821 | A1 * | 8/2002 | Sen et al. | 463/42 |
| 2003/0103525 | A1 | 6/2003 | Wahl | |
| 2003/0152083 | A1 | 8/2003 | Nagata et al. | |
| 2004/0066783 | A1 * | 4/2004 | Ayyagari | 370/395.3 |
| 2004/0156367 | A1 * | 8/2004 | Albuquerque et al. | 370/395.4 |
| 2004/0228296 | A1 * | 11/2004 | Lenzini et al. | 370/322 |
| 2005/0101328 | A1 * | 5/2005 | Son et al. | 455/436 |

(Continued)

FOREIGN PATENT DOCUMENTS

EP    1 209 936    5/2002

(Continued)

OTHER PUBLICATIONS

Guo Song Chu et al., A QoS Architecture for the MAC Protocol of IEEE 802.16 BWA System, 2002 IEEE, pp. 435-439.

(Continued)

*Primary Examiner*—Thong H Vu
(74) *Attorney, Agent, or Firm*—The Farrell Law Firm, LLP

(57) ABSTRACT

A method and apparatus for scheduling data in a communication system. Data is classified into at least one Quality of Service (QoS) class having a series of priorities according to QoS of the data. The classified data is scheduled according to the series of priorities of the at least one QoS class.

22 Claims, 4 Drawing Sheets

U.S. PATENT DOCUMENTS

| | | | |
|---|---|---|---|
| 2005/0163103 A1* | 7/2005 | Malomsoky et al. | 370/352 |
| 2006/0002383 A1* | 1/2006 | Jeong et al. | 370/360 |
| 2006/0029011 A1* | 2/2006 | Etemad et al. | 370/311 |
| 2007/0243873 A1* | 10/2007 | Jin et al. | 455/436 |
| 2008/0037567 A1* | 2/2008 | Cho et al. | 370/401 |

FOREIGN PATENT DOCUMENTS

| | | |
|---|---|---|
| EP | 1 469 641 | 10/2004 |
| JP | 08-307442 | 11/1996 |
| JP | 11-196102 | 7/1999 |
| JP | 2002-016646 | 1/2002 |
| JP | 2003-500949 | 1/2003 |
| JP | 2004-289836 | 10/2004 |
| KR | 10-2005-0021965 | 3/2005 |
| WO | WO 2005/046085 | 5/1905 |
| WO | WO 00/72608 | 11/2000 |

OTHER PUBLICATIONS

Yongjoo Tcha et al., QoS Management for Facilitation of Uplink Scheduling, IEEE 802.16 Broadband Wireless Access Working Group, Aug. 17, 2004.

L.F.M. deMoraes et al., Analysis and Evaluation of a New MAC Protocol for Broadband Wireless Access, 2005 IEEE.

Nakajima et al.: "A Study of User Selective System of VoIP QoS Strategies", May 9, 2003.

* cited by examiner

APPARATUS AND METHOD FOR SCHEDULING DATA IN A COMMUNICATION SYSTEM

PRIORITY

This application claims priority under 35 U.S.C. § 119 to an application entitled "Apparatus and Method for Scheduling Data in a Communication System" filed in the Korean Intellectual Property Office on Jul. 19, 2005 and assigned Serial No. 2005-65533, the contents of which are incorporated herein by reference.

BACKGROUND OF THE INVENTION

1. Field of the Invention

The present invention generally relates to a communication system, and more particularly to an apparatus and method for scheduling data in a communication system.

2. Description of the Related Art

A large amount of research is being conducted to provide users with high-speed services based on various service qualities in fourth-generation (4G) communication systems serving as next-generation communication systems. Specifically, active research is being conducted to support high-speed services for guaranteeing mobility and Quality of Service (QoS) in Broadband Wireless Access (BWA) communication systems such as Wireless Local Area Network (WLAN) and Metropolitan Area Network (MAN) communication systems in the current 4G-communication systems.

On the other hand, the communication system requires various service qualities. Factors for determining the various service qualities are as follows. The various service qualities depend upon the degree of delay for data transmission and reception, for example, real-time data and non-real-time data. The various service qualities are determined by many factors such as fading characteristics, the closeness between transmitting and receiving devices, a diversity application, and so on. QoS-based scheduling is required to stably send data.

However, the current communication system does not consider QoS-based scheduling. Thus, a need exists for QoS-based scheduling.

SUMMARY OF THE INVENTION

It is, therefore, an object of the present invention to provide an apparatus and method for scheduling data on the basis of Quality of Service (QoS) in a communication system.

In accordance with an aspect of the present invention, there is provided a method for scheduling data in a communication system, which includes classifying data into at least one Quality of Service (QoS) class having a series of priorities according to QoS of the data; and scheduling the classified data according to the series of priorities of the at least one QoS class.

In accordance with another aspect of the present invention, there is provided an apparatus for scheduling data according to Quality of Service (QoS) in a communication system, including a QoS Radio Frequency (RF) scheduler for classifying data into at least one QoS class having a series of priorities according to QoS of the data and scheduling the classified data according to the series of priorities of the at least one QoS class.

BRIEF DESCRIPTION OF THE DRAWINGS

The above and other objects and aspects of the present invention will be more clearly understood from the following detailed description taken in conjunction with the accompanying drawings, in which.

DETAILED DESCRIPTION OF THE PREFERRED EMBODIMENTS

Preferred embodiments of the present invention will be described in detail herein below with reference to the accompanying drawings. In the following description, detailed descriptions of functions and configurations incorporated herein that are well known to those skilled in the art are omitted for clarity and conciseness.

The present invention provides a Quality of Service (QoS)-based scheduling method. The QoS-based scheduling method in a communication system classifies QoS classes according to QoS priorities and performs a scheduling process in order of the classified QoS classes.

Figure 1:
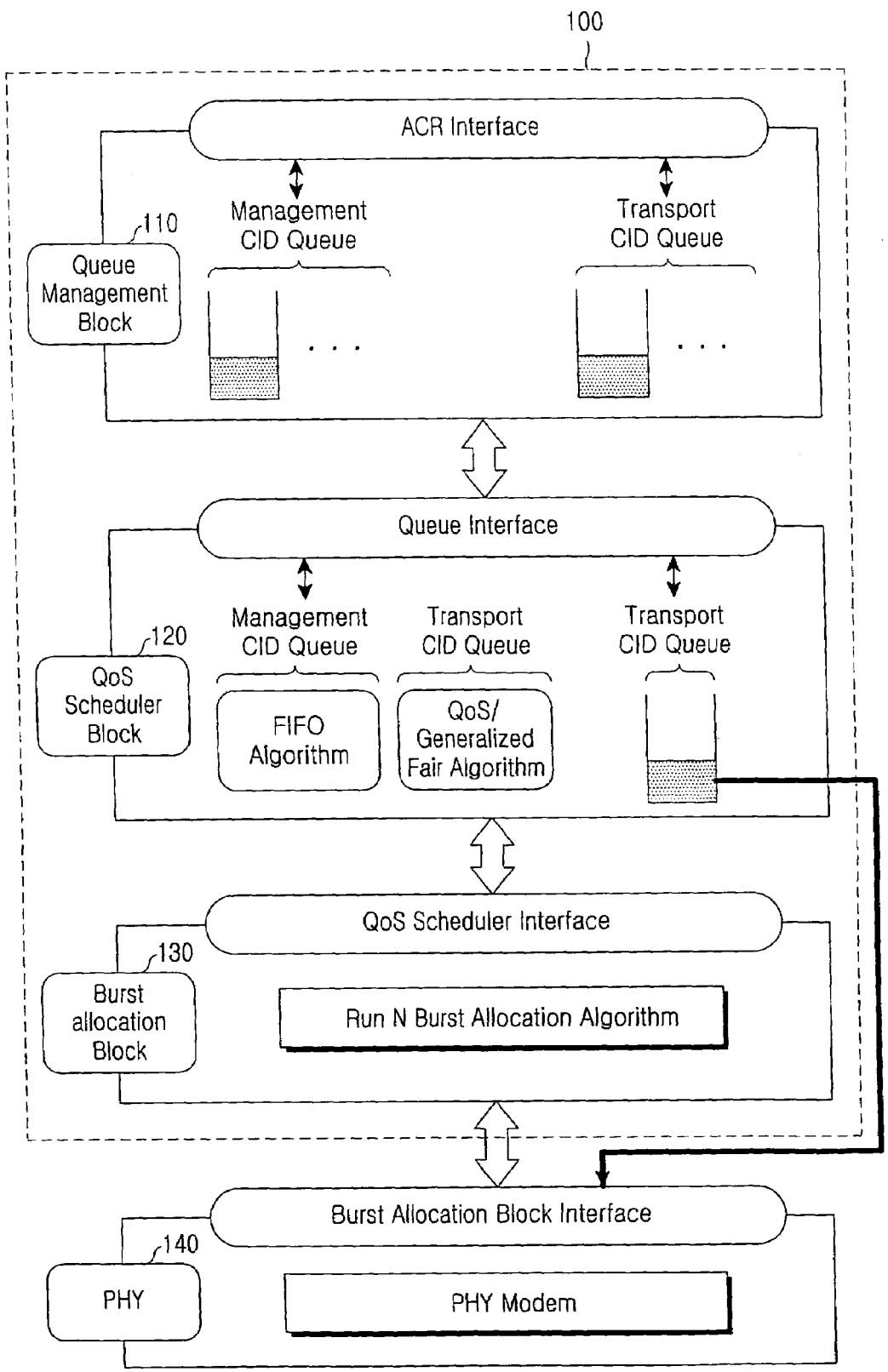
FIG. 1 schematically illustrates a structure of a Radio Frequency (RF) scheduler in accordance with the present invention.

FIG. 1 schematically illustrates a structure of a QoS Radio Frequency (RF) scheduler in accordance with the present invention.

Referring to FIG. 1, the structure of the QoS RF scheduler 100 is divided into three conceptual layers of a queue management block 110, a QoS scheduler block 120, and a burst allocation block 130. As illustrated in FIG. 1, there is a PHYsical modem of a PHYsical layer 140.

The communication system classifies data flow between nodes using two messages, i.e., a Medium Access Control (MAC) management message and a transport message, according to QoS characteristics. The messages considering QoS are identified by Connection Identifiers (CIDs).

The queue management block 110 receives the messages through an Access Control Router (ACR) interface and classifies and manages the MAC management message and the transport message according to QoS. The MAC management message and the transport message are identified by the CIDs. The message CIDs are managed in a MAC management CID queue and a transport CID queue.

The MAC management message, serving as a type of control message of a MAC layer, is classified as a broadcast message, a basic message, a primary message, and a secondary message. The secondary message is not considered herein.

The transport message serving as a message for a data transmission and reception is classified according to an Unsolicited Granted Service (UGS), real-time Polling Service (rtPS), extended real-time Polling Service (ertPS), non-real-time Polling Service (nrtPS), and Best Effort Service (BES).

In the present invention, messages classified according to the QoS characteristics can be classified into a series of QoS classes. Thus, the MAC management message and the transport message are classified into the QoS classes. Each message to be scheduled is classified into a detailed QoS class.

Now, an operation for setting each QoS class and performing QoS scheduling will be described in detail.

After QoS scheduling is performed, the QoS scheduler block 120 sends a result of the QoS scheduling to the burst allocation block 130 through a QoS scheduler interface. Then, the burst allocation block 130 allocates scheduled data bursts using a predetermined allocation algorithm. Because a process for allocating the bursts is not directly related to the present invention, its detailed description is omitted herein.

Data bursts allocated by the burst allocation block 130 are sent to the PHYsical modem of the PHYsical layer 140 through a burst allocation block interface. The PHYsical modem of the PHYsical layer 140 inserts a data burst of the RF scheduler 100 into a transmission frame. Next, a scheduling operation of the RF scheduler will be described with reference to FIG. 2.

Figure 2:
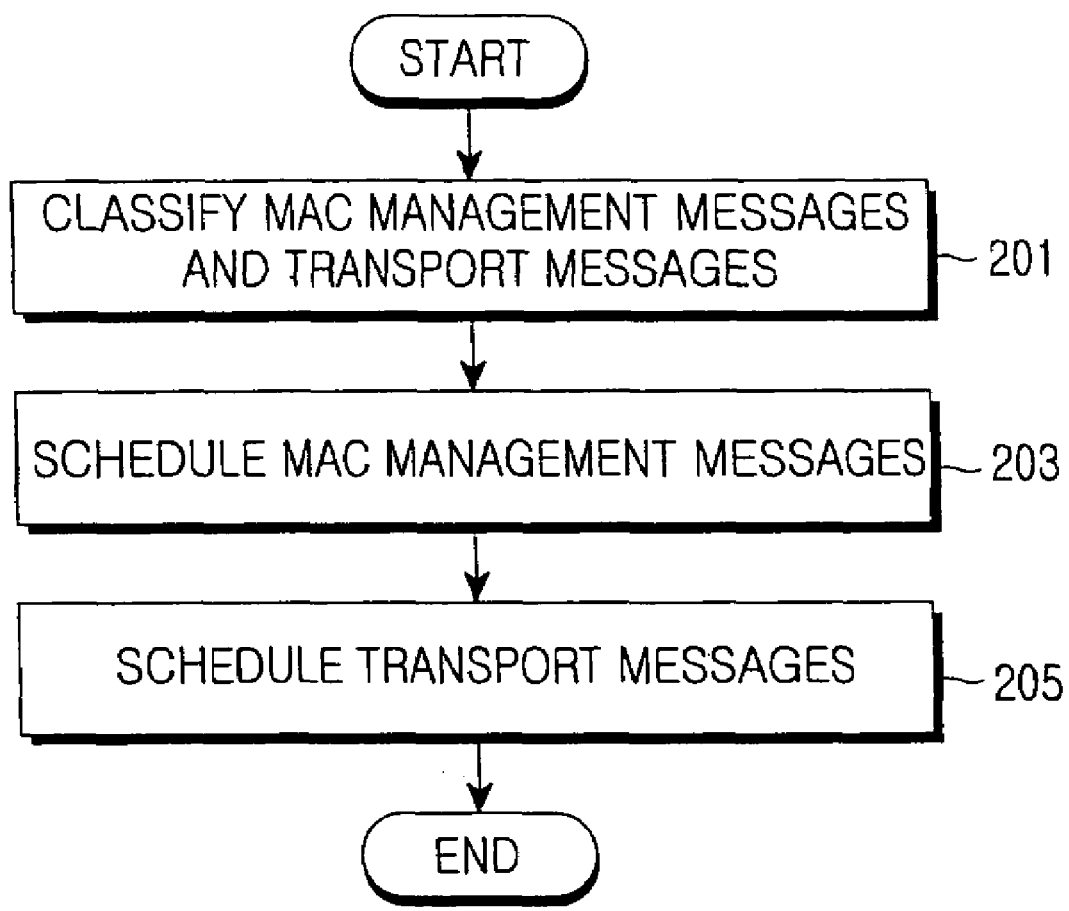
FIG. 2 is a flowchart illustrating a Quality of Service (QoS)-based scheduling process in accordance with the present invention.

FIG. 2 is a flowchart schematically illustrating a QoS-based scheduling process in accordance with the present invention.

Referring to FIG. 2, the queue management block classifies received messages into a MAC management message and a transport message using message CIDs in step 201 and then proceeds to step 203. The CIDs are managed in predetermined queues.

The QoS scheduler block classifies MAC management messages into a plurality of QoS classes to schedule the MAC management messages in step 203 and then proceeds to step 205.

First, a concrete example of the MAC management messages is as follows.

Broadcast messages are DownLink MAP (DL MAP), UpLink MAP (UL MAP), Downlink Channel Descriptor (DCD), Uplink Channel Descriptor (UCD) message, Mobile Neighbor Advertisement (MOB-NBR-ADV), Mobile Traffic Indication (MOB-TRF-IND) and Mobile Paging Advertisement (MOB-PAG-ADV) messages, and so on.

Basic and primary messages are Ranging Request (RNG-REQ), Ranging Response (RNG-RSP), mS-Basic-Capability Request (SBC-REQ) and mS-Basic-Capability Response (SBC-RSP) messages, and so on.

The MAC management message is sent only to a particular receiver in a unicast scheme. The broadcast and basic messages cannot be conventionally fragmented, but the DCD/UCD messages can be fragmented using fragmentable CIDs. In the present invention, the fragmentation of the MAC management message is not considered.

The above-described MAC management messages are used for a connection and maintenance between communication networks as well as a Mobile Station (MS) and a Base Station (BS). Thus, the MAC management messages are more important than general data to be sent on the communication network. Herein, the MAC management messages require higher QoS. The MAC management messages are classified into at least one QoS class, and are scheduled in a state in which they have a higher priority than the transport messages.

When the QoS scheduler blockschedules the MAC management messages, they are classified into QoS classes having priorities according to QoS. This will be described in the following example.

First Embodiment

When MAC management messages are scheduled, the QoS scheduler block first considers and schedules MAP messages containing allocation information to be sent in every frame among the broadcast messages.

Next, the QoS scheduler block schedules MOB-TRF-IND and MOB-PAG-ADV messages such that they have priorities subsequent to those of the MAP messages among broadcast messages. When a mobile station operates in sleep mode, the MOB-TRF-IND message is used to give notification that data to be sent is present. When the mobile station operates in idle mode, the MOB-PAG-ADV message is used to give notification that data to be sent to the mobile station is present. The reason why the MOB-TRF-IND and MOB-PAG-ADV messages are scheduled such that they have the priorities subsequent to those of the MAP messages is that the mobile station operating in the sleep or idle mode receives downlink data only during a relatively short time interval and does not receive data after the time interval. Thus, if the MOB-TRF-IND and MOB-PAG-ADV messages are not correctly transmitted and received, a data transmission delay occurs. This delay degrades QoS performance.

Even though the broadcast messages other than the above-described DL/UL MAP, MOB-TRF-IND and MOB-PAG-ADV messages are sent after a delay of several frames, QoS does not vary. Thus, the QoS scheduler block classifies the MAC management messages into five-step QoS classes according to scheduling priorities. The first QoS class includes the DL and UL MAP messages. The second QoS class includes the MOB-TRF-IND and MOB-PAG-ADV messages. The third QoS class includes a basic message. The fourth QoS class includes a primary message. The fifth QoS class includes broadcast messages, for example, DCD, UCD and MOB-NBR-ADV messages, from which the messages belonging to the first and second QoS classes are excluded.

In the first embodiment, the MAC management messages are classified into the five QoS classes and are scheduled according to priorities.

Second Embodiment

In the second embodiment like the first embodiment, MAC management messages may be classified into five QoS classes. However, the second embodiment can classify the MAC management messages into a smaller number of QoS classes than the number of QoS classes in the first embodiment. That is, in the second embodiment, the QoS scheduler block classifies the MAC management messages into two classes.

When the MAC management messages are scheduled as in the first embodiment, the QoS scheduler block first considers and schedules MAP messages containing allocation information to be sent in every frame among broadcast messages.

Next, the remaining MAC management messages can be classified into one QoS class. In other words, the QoS scheduler block schedules the remaining MAC management messages such that they have priorities subsequent to those of MAP messages. That is, the MOB-TRF-IND message, the MOB-PAG-ADV message, the basic message, the primary message, and the remaining broadcast messages (e.g., DCD, UCD and MOB-NBR-ADV messages) are classified into one QoS class.

In accordance with the second embodiment, the MAC management messages are classified into two first and second classes. The first QoS class includes the DL and UL MAP messages, and the second QoS class includes the MOB-TRF- IND message, the MOB-PAG-ADV message, the basic message, the primary message, and the remaining broadcast messages (e.g., the DCD, UCD and MOB-NBR-ADV messages).

The two embodiments as described above are exemplary only. A plurality of cases can be present when the MAC management messages are classified into classes.

The QoS scheduler block schedules MAC management messages on the basis of QoS classes with priorities as described above. Messages included in the same QoS class are scheduled in a First Input First Output (FIFO) scheme. The FIFO scheme is one example only. When the scheduling process is performed, a Round-Robin (RR) scheme may be applied.

Referring back to FIG. 2, In step 205, the QoS scheduler block schedules transport messages. The transport messages are classified into a plurality of QoS classes and then are scheduled. Now, the scheduling process for the transport messages will be described. The transport messages are classified with a UGS, rtPS, ertPS, nrtPS, and BES according to QoS. Like the MAC management messages, the transport messages are scheduled according to QoS classes. Characteristics of the transport messages will be described with reference to Table 1.

rate, minimum reserved traffic rate, maximum latency, tolerated jitter, request/transmission policy, and so on. Among the above parameters, the maximum sustained traffic rate, minimum reserved traffic rate, and maximum latency are considered as the most important QoS parameters.

When data is sent in UGS, the piggyback request for carrying another signal on an existing signal and bandwidth stealing are not allowed. In a polling process for continuously checking a state of a receiving side for receiving service, a Poll Me (PM) bit is used to request a unicast poll for bandwidth needs of non-UGS connections.

rtPS is a real-time service in which a variable bandwidth is continuously allocated while a connection is maintained, and is applied for Moving Picture Experts Group (MPEG) video.

The QoS service flow parameters of rtPS are the maximum sustained traffic rate, minimum reserved traffic rate, request/transmission policy, and so on. In rtPS different from UGS, both the piggyback request and bandwidth stealing are allowed and only unicast polling is possible in the polling process.

nrtPS is a non-real-time service for providing delay-tolerant data streams consisting of variable-sized data for which the minimum data rate is required. nrtPS is applied for a File

TABLE 1

| | Scheduling type | | | |
|---|---|---|---|---|
| | UGS | rtPS | nrtPS | BES |
| Service characteristics | Real-time data streams consisting of fixed-size data packets issued at periodic intervals | Real-time data streams consisting of variable-sized data packets issued at periodic intervals | Delay-tolerant data streams consisting of variable-sized data packets for which a minimum data rate is required | Data streams for which no minimum service level is required |
| Application | T1/E1, VoIP | MPEG video | FTP | Web |
| Mandatory QoS Service Flow Parameter | Maximum sustained traffic rate Minimum reserved traffic rate Maximum latency Tolerated Jitter, Request/Transmission Policy | Maximum sustained traffic rate Minimum reserved traffic rate Maximum latency, Request/Transmission Policy | Maximum sustained traffic rate Minimum reserved traffic rate Traffic priority, Request/Transmission Policy | Maximum sustained traffic rate Traffic priority, Request/Transmission policy |
| Piggyback Request | Not allowed | Allowed | Allowed | Allowed |
| Bandwidth Stealing | Not allowed | Allowed | Allowed | Allowed |
| Polling | PM bit is used to request a unicast poll for BW needs of non-UGS connections | Only unicast polling | Unicast polling only or all forms of polling | All forms of polling |

Table 1 shows the UGS, rtPS, ertPS, nrtPS, and BES of the transport messages and their characteristics.

UGS is a real-time service in which the same size of data, i.e., the same bandwidth, is periodically allocated while a connection is maintained. Conventionally, the voice transmission corresponds to UGS. UGS is applied to a Voice over Internet Protocol (VoIP), E1/T1, and so on. The QoS service flow parameters of UGS are the maximum sustained traffic Transfer Protocol (FTP) and so on. The QoS service flow parameters of nrtPS are the maximum sustained traffic rate, minimum reserved traffic rate, traffic priority, request/transmission policy, and so on. In nrtPS, both the piggyback request and bandwidth stealing are allowed. Unicast polling only or all forms of polling are possible in the polling process.

BES provides data streams for which no minimum service level is required. The QoS service flow parameters of BES are the maximum sustained traffic rate, traffic priority, request/transmission policy, and so on. BES is applied for a Web service. In BES, both the piggyback request and bandwidth stealing are allowed and all forms of polling are possible in the polling process.

There is an ertPS message other than the above-described transport messages. ertPS supports a function for interrupting resource allocation during a call interval that does not affect quality. For example, the mobile station notifies in advance the base station that resource allocation for a UL burst transmission is not required before the start of a silence spurt interval that does not affect the call quality. When a call starts again, the mobile station sends a resource allocation request to the base station using a codeword designated in a Channel Quality Indicator CHannel (CQICH). Then, the base station allocates possible resources to the mobile station and sends data bursts through the UL.

Traffic sent in the above-described UGS, rtPS, and ertPS are real-time data. The traffic is classified into one QoS class and is sent in a state in which an absolute priority is not set. Because scheduling is possible in variable priorities according to system characteristics or situations, the variable priorities can be applied according to settings of system designers or service providers. The present invention includes UGS, rtPS, and ertPS in one QoS class without classifying them.

A scheduling algorithm for computing a priority in the QoS class including UGS, rtPS, and ertPS is as follows. When the QoS class is scheduled, the QoS scheduling algorithm is employed.

In the current communication system, variable resource allocation is conventionally possible. However, the conventional QoS scheduling algorithm is a type of token-based scheduling algorithm. Parameters used in the QoS scheduling algorithm of the present invention are constructed with (x, y). The QoS scheduling algorithm of the present invention is an algorithm for guaranteeing a particular probability in which at least x packets can be sent during a y time. Additionally, a z parameter for limiting the number of packets can be applied.

Because variable resource allocation is conventionally possible in the current communication system, the token may not be defined and therefore the x parameter may not be considered. Thus, they parameter may be considered.

A priority $P_k$ of an actual k-th message is defined as shown in Equation (1).

$$P_k = \left(\frac{r_k}{\text{avg}(r_k)}\right)^\alpha \left(\frac{y_{required}}{y_{remain}}\right)^\gamma P_{connection} \quad (1)$$

In Equation (1), $P_k$ is the current priority and $r_k$ is a CINR reported by the mobile station and can use a short term CINR average. Also, $\text{avg}(r_k)$ is a long term average. $y_{remain}$ and $y_{required}$ are y parameters. $P_{connection}$ is a relative priority of each connection, i.e., each service class. $\alpha$ and $\gamma$ have variable values.

An average value of $r_k$ is computed through 1-tap Infinite Impulse Response (IIR) filtering, and is defined as shown in Equation (2).

$$\bar{r}_k(n) = \lambda \bar{r}_k(n-1) + (1-\lambda) r_k(n), \text{ where } \lambda = 1 - \beta/\alpha \quad (2)$$

An average value of the short and long terms can be computed by varying $\lambda$ value of Equation (2).

$y_{remain}$ can be computed by Equation (3).

$$y_{remain} = y_{required} - (t_{current} - t_{head\ of\ line\ arrival}) \quad (3)$$

Consequently, $y_{remain}$ is the remaining time required for a delay of a head-of-line packet. When the priority is computed in the QoS scheduling algorithm used in the present invention, the maximum delay requirement due to an end-to-end delay occupies an important part for QoS in a receiving side for receiving a message.

If a data transmitting side, i.e., a data source does not stamp a point of time when data is generated or modulated in a transmission frame in the case of the DL, the end-to-end delay requirement cannot be satisfied. Thus, the time stamp is sent by stamping a generation time in the data source. Even though the data source performs time stamping, cross-layer violation occurs when the time stamp is inserted in a higher layer than the MAC layer, for example, an application layer and so on.

Thus, $y_{required}$ is preset by measuring or estimating in advance end-to-end delay components from which constant delay components having a significant variation in the scheduling time are excluded. In an example of VoIP, $y_{required}$ is computed by Equation (4).

$$y_{required} = \frac{1}{2} \times ((\text{End-to-End Delay Constraint Value} - \text{Sum of Constant Delay Components}) \quad (4)$$

For example, when a call between mobile stations is set up through a path in the case of VoIP, $y_{required}$ can be computed. $y_{required}$ is determined by a difference between a delay constraint value of a predetermined reference and a sum of constant delay components.

When an EVolution Data-Only (EV-DO) environment and a vocoder are considered, the constant delay components are defined as shown in Table 2.

TABLE 2

| Delay Component | WiBro Mobile to Mobile |
|---|---|
| Vocoder (Alg. Proc.) | 35 ms |
| Packet Processing (Turbo Cod,. demod./decod., MAC) | 15 ms |
| BTS-PDSN | 20 ms |
| Core VoIP Network | 15 ms |
| Handset Playback Buffer (decod., De-jitter) | 23 ms |
| Total | 108 ms |

First, the sum of constant delay components is 108 ms. When the end-to-end delay is 270 ms, $y_{required} = \frac{1}{2} \ast (270 \text{ ms} - 108 \text{ ms}) = 81$ ms. Because an actual one-frame time is 5 ms, an actual $y_{required}$ value is 80 ms.

If the QoS requirement is not satisfied in the QoS scheduling algorithm, for example, $y_{remain}$ becomes less than 0. In this case, the QoS scheduler block discards an associated packet in the scheduling time.

Traffic to be sent in the above-described nrtPS and BES are classified into one QoS class and transmitted without an absolute priority.

nrtPS provides a unicast polling opportunity in a long interval, for example, in a period of about 1 ms. In a congested network state, excessive performance degradation is avoided through congestion control of at least TCP/IP. nrtPS is the data-oriented service, but requires more service fees than BES, and is sensitive to a delay among data services. nrtPS corresponds to a data service for a user using an online stock trade, mobile commerce and premium service.

This case is not related to a QoS parameter for providing the minimum reserved data rate and therefore nrtPS does not require special call admission control. Consequently, in the network in which traffic of the nrtPS and BES are provided together, an absolute priority is not applied, except that a periodic unicast polling opportunity in UL scheduling is provided in a relatively long period. In the scheduling of nrtPS and BES, an exclusive priority is not applied. nrtPS and BES are classified into the same QoS class without the exclusive priority and then are scheduled.

The scheduling of nrtPS and BES uses a Proportional Fair (PF) algorithm capable of guaranteeing proper throughput and fairness in the conventional data service. The PF algorithm is a scheme obtained by combining advantages of a Max Carrier to Interference ratio (Max C/I) scheme and a Max-Min fairness scheme. The PF algorithm is a scheduling scheme for maximizing the total throughput while guaranteeing fairness between subscriber stations. Moreover, the PF algorithm exhibits relatively excellent performance while guaranteeing fairness between subscriber stations and maximizing the total throughput.

However, the present invention uses a modified Generalized Fair (GF) scheme. The modified GF scheme is defined as shown in Equation (5).

$$P_k(n) = r_k(n)/T_k(n) \times p_{connection} \quad (5)$$

Herein, k is a user index, n is a time frame index, $r_k(n)$ is a Modulation order Product Rate (MPR), and $p_{connection}$ is a relative priority of each connection, i.e., each service class. $T_k(n)$ is an average throughput up to an n time frame. $T_k(n)$ is computed through 1-tap IIR filtering and is defined as shown in Equation (6).

$$T_k(n) = \lambda \times T_k(n-1) + (1-\lambda) \times N_k(n-1), \lambda = 1 - \beta/\alpha \quad (6)$$

$N_k(n-1)$ is the number of information bits allocated in an (n−1) time frame.

As described above, the scheduling of nrtPS and BES is performed using Equation (5) and the modified GF scheme. Accordingly, the transport messages are classified into two QoS classes. The first QoS class includes UGS, rtPS, and ertPS, and the second QoS class includes nrtPS and BES. As shown in Equation (2), the QoS scheduling algorithm is applied for the first QoS class including UGS, rtPS, and ertPS. The modified GF algorithm is applied for the second QoS class including nrtPS and BES.

The QoS scheduling operation has been described with reference to FIG. 2. A sequence of scheduling QoS classes will be described with reference to FIGS. 3 and 4.

Figure 3:
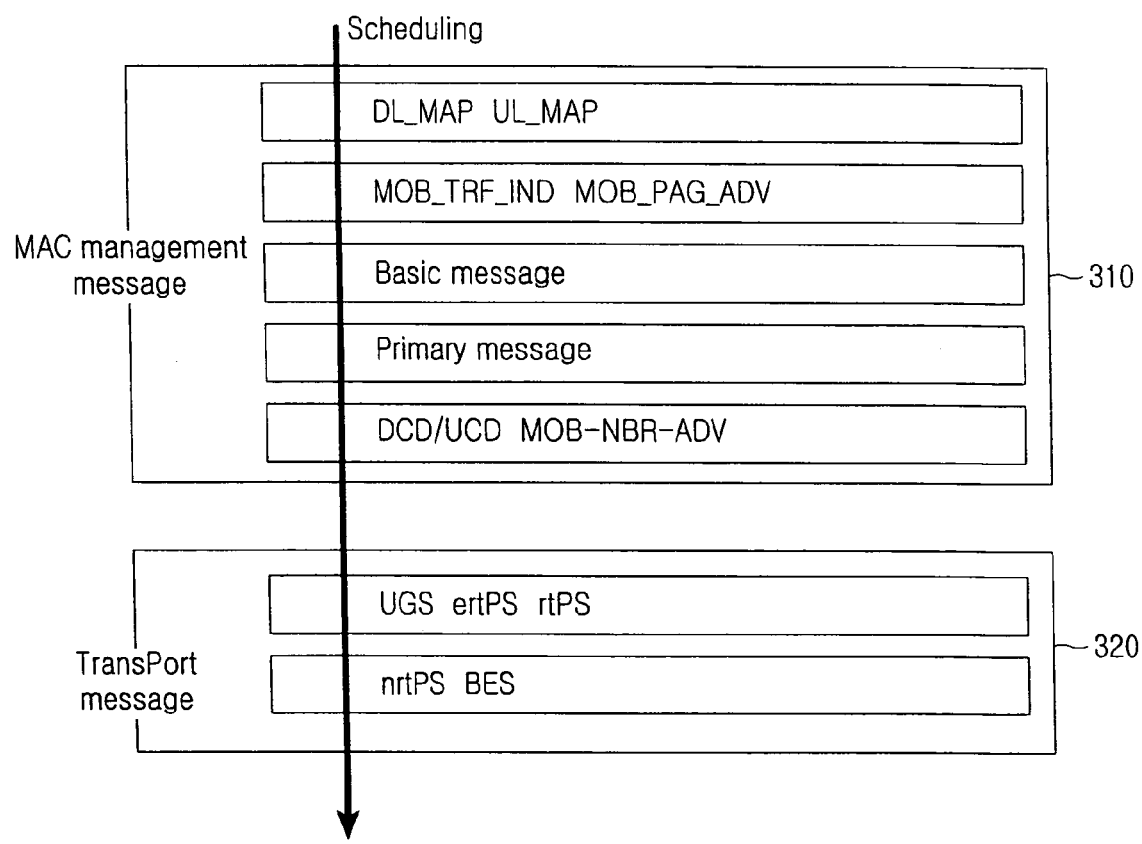
FIG. 3 schematically illustrates a sequence of scheduling QoS classes in accordance with a first embodiment of the present invention.

FIG. 3 schematically illustrates a sequence of scheduling QoS classes in accordance with a first embodiment of the present invention.

Referring to FIG. 3, QoS classes are sequentially illustrated. A scheduling process is performed in which MAC management messages 310 have a higher priority than transport messages 320.

The MAC management messages 310 are classified into detailed QoS classes. The first QoS class includes DL and UL MAP messages. The second QoS class includes MOB-TRF-IND and MOB-PAG-ADV messages. The third QoS class includes a basic message. The fourth QoS class includes a primary message. The fifth QoS class includes broadcast messages, for example, DCD, UCD and MOB-NBR-ADV messages, from which the messages included in the first and second QoS classes are excluded.

The transport messages 320 are classified into two QoS classes. Because the MAC management messages 310 are classified into the five classes, the class including UGS, rtPS, and ertPS can be referred to as the sixth QoS class. The seventh QoS class to be scheduled subsequent to the sixth QoS class includes nrtPS and BES.

Figure 4:
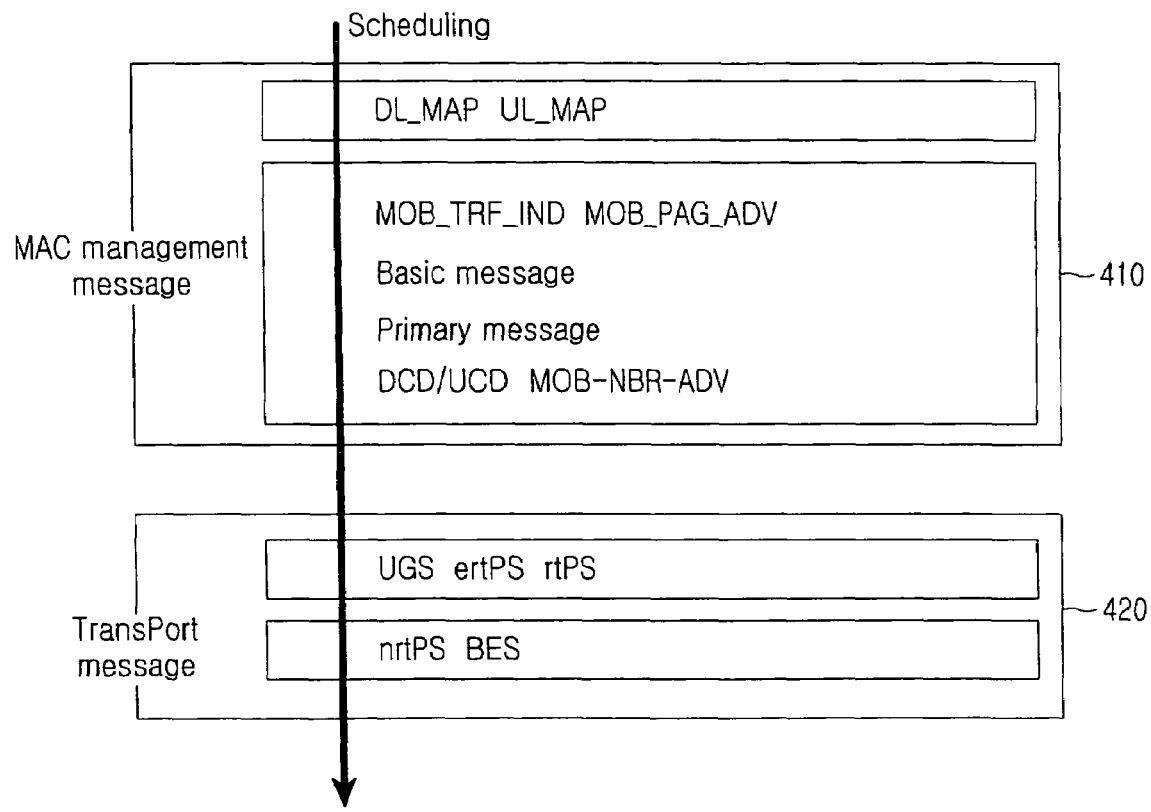
FIG. 4 schematically illustrates a sequence of scheduling QoS classes in accordance with another embodiment of the present invention.

FIG. 4 schematically illustrates a sequence of scheduling QoS classes in accordance with another embodiment of the present invention.

Referring to FIG. 4, QoS classes are sequentially illustrated. MAC management messages 410 are scheduled such that they have a higher priority than transport messages 420.

The MAC management messages 410 are classified into detailed QoS classes. The first QoS class includes DL and UL MAP messages. The second QoS class includes MOB-TRF-IND and MOB-PAG-ADV messages, a basic message, a primary message, and DCD, UCD and MOB-NBR-ADV messages. The second QoS class includes all broadcast messages except the messages included in the first QoS class.

The transport messages 420 are classified into two QoS classes. Because the MAC management messages 410 are classified into the two classes, the class including UGS, rtPS, and ertPS can be referred to as the third QoS class. The fourth QoS class to be scheduled subsequent to the third QoS class includes nrtPS and BES.

In the present invention, MAC management messages and transport messages are classified into seven or four classes and are scheduled according to priorities. When the scheduling process is performed, the MAC management messages included in the same QoS class are scheduled in the FIFO scheme. Transport messages are applied to the modified GF algorithm and the QoS scheduling algorithm according to QoS classes.

Additionally, there is considered the case where a Hybrid Automatic Retransmission Request (HARQ) scheme is applied in the PHYsical layer. When Protocol Data Units (PDUs) with different CIDs are concatenated and retransmitted with respect to a burst to be sent to one mobile station, it is difficult for a priority of the associated data burst to be set. Because the maximum retransmission fails when the HARQ retransmission is delayed, a Negative Acknowledgement (NACK) message to an actual Automatic Repeat Request (ARQ) should be sent, such that QoS may be degraded. Thus, the HARQ should be quickly processed. A queue for the HARQ retransmission is included and managed in the QoS scheduler block rather than the queue management block. Data of the retransmission queue is processed before an initial transmission packet is processed. At this time, a priority of an initial transmission packet of MOB-TRF-IND and MOB-PAG-ADV message is maintained.

Scheduling in the ARQ scheme can be changed according to design of a higher ACR, and has two cases. In one case, the ACR classifies retransmission packets. In the other case, the ACR does not classify retransmission packets. When the retransmission packets are not classified, the conventional scheduling process is performed.

When the ACR classifies the retransmission packets in a retransmission time, a scheduler needs to be corrected.

First, CIDs of transport messages to be retransmitted have two queues. In this case, CIDs of MAC management messages are not considered because they are not retransmitted. When a retransmission function relative to the CIDs of the transport messages are disabled, the CIDs of the transport messages can be sufficiently managed in one queue. However, when the retransmission function is enabled in an ON state, two independent FIFO queues are separately managed.

Second, if an associated CID is selected in the scheduling algorithm when retransmission queues for all classes are full, the scheduler first sends retransmission packets to the PHYsical modem.

Third, in the case of the QoS class relative to the QoS scheduling of UGS, rtPS, and ertPS, a priority and $y_{remain}$ are computed on the basis of a Head-Of-Line (HOL) packet of a retransmission queue. When the ACR sends packets of UGS, rtPS, and nrtPS to a Remote Access Server (RAS) for the computation of the QoS scheduling algorithm, a procedure for associating the packets with a frame number is required. Any one of the ACR or RAS can perform time stamping in the initial transmission. In case of the retransmission, only the ACR can know an arrival time of an associated packet. Thus, the ACR performs the time stamping for recording the time equal to the first transmission time while receiving a packet in a retransmission queue. When $y_{remain}$ computed by the time stamp is less than 0, an associated packet is discarded.

The present invention divides QoS classes and performs a scheduling process according to priorities of the QoS classes. Thus, the present invention can perform the scheduling process while guaranteeing QoS of MAC management messages and transport messages. Moreover, the present invention can increase efficiency according to system performance by performing the QoS-based scheduling process.

Although the exemplary embodiments of the present invention have been disclosed for illustrative purposes, those skilled in the art will appreciate that various modifications, additions, and substitutions are possible, without departing from the scope of the present invention. Therefore, the present invention is not limited to the above-described embodiments, but is defined by the following claims, along with their full scope of equivalents.

What is claimed is:

1. A method for scheduling data in a communication system, the method comprising the steps of:
classifying the data into a Medium Access Control (MAC) management message and a transport message according to a Connection Identifier (CID) of the data;
classifying each of the MAC management message and the transport message into at least one Quality of Service (QoS) class having a series of priorities according to a QoS; and
scheduling the at least one QoS class according to the series of priorities,
wherein the transport message is classified into one of a first QoS class including an unsolicited granted service, real-time polling service, and an extended real-time polling service, or a second QoS class including a non-real-time polling service and best effort service, and
wherein the first QoS class is scheduled by:

$$P_k = \left(\frac{r_k}{\text{avg}(r_k)}\right)^\alpha \left(\frac{y_{required}}{y_{remain}}\right)^\gamma P_{connection},$$

where $r_k$ is a Carrier-to-Interference plus Noise power ratio (CINR) reported by a mobile station, $\text{avg}(r_k)$ is a long term average, $y_{remain}$ is a remaining time required for a delay of a head-of-line packet, $y_{required}$ is a difference between a delay constraint value of a predetermined reference and a sum of constant delay components, and $p_{connection}$ is a relative priority of each connection.

2. The method of claim 1, wherein the MAC management message has a higher priority than the transport message in a scheduling time.

3. The method of claim 1, wherein the MAC management message is classified into one of a third QoS class including downlink and uplink MAP messages, a fourth QoS class including mobile traffic indication and mobile paging advertisement messages, a fifth QoS class including a basic message, a sixth QoS class including a primary message, and a seventh QoS class including a downlink channel descriptor, an uplink channel descriptor and mobile neighbor advertisement messages, according to a scheduling priority.

4. The method of claim 3, wherein the seventh QoS class includes broadcast messages from which the messages of the third and fourth QoS classes are excluded.

5. The method of claim 1, wherein the MAC management message is classified into one of an eighth QoS class including downlink and uplink MAP messages and a ninth QoS class including a mobile traffic indication message, a mobile paging advertisement message, a basic message, a primary message, a downlink channel descriptor message, an uplink channel descriptor message, and a mobile neighbor advertisement message, according to a scheduling priority.

6. The method of claim 5, wherein the ninth QoS class includes all broadcast messages from which the messages of the eighth QoS class are excluded.

7. The method of claim 1, wherein the MAC management message is scheduled in a First Input First Output (FIFO) scheme according to each QoS class.

8. The method of claim 1, wherein the second QoS class is scheduled by:

$$P_k(n) = r_k(n)/T_k(n) \times p_{connection},$$

where k is a user index, n is a time frame index, $r_k(n)$ is a Modulation order Product Rate (MPR), $p_{connection}$ is a relative priority of each connection, and $T_k(n)$ is an average throughput up to an n time frame.

9. The method of claim 1, wherein when an automatic retransmission scheme is applied in the scheduling step, data to be retransmitted has a higher priority than data to be initially transmitted.

10. The method of claim 9, wherein when the data to be initially transmitted is one of a mobile traffic indication message and a mobile paging advertisement message, the data to be initially transmitted has a higher priority than the data to be retransmitted.

11. An apparatus for scheduling data according to Quality of Service (QoS) in a communication system, the apparatus comprising:
a QoS Radio Frequency (RF) scheduler for classifying data into at least one QoS class having a series of priorities according to QoS of the data and scheduling at least one QoS class according to the series of priorities, wherein the QoS RF scheduler includes a queue management block for classifying the data into a Medium Access Control (MAC) management message and a transport message according to a Connection Identifier (CID); and
a QoS scheduler block for classifying each of the MAC management message and the transport message into the at least one QoS class, and scheduling the at least one QoS class according to the series of priorities,
wherein the QoS scheduler block classifies the transport message into a first QoS class comprising an unsolicited granted service, a real-time polling service, and an extended real-time polling service or a second QoS class comprising a non-real-time polling service and a best effort service, and
wherein the first QoS class is scheduled by:

$$P_k = \left(\frac{r_k}{\text{avg}(r_k)}\right)^\alpha \left(\frac{y_{required}}{y_{remain}}\right)^\gamma P_{connection},$$

where $r_k$ is a Carrier-to-Interference plus Noise power ratio (CINR) reported by a mobile station, $\text{avg}(r_k)$ is a long term average, $y_{remain}$ is a remaining time required for a delay of a head-of-line packet, $y_{required}$ is a difference between a delay constraint value of a predetermined reference and a sum of constant delay components, and $p_{connection}$ is a relative priority of each connection.

12. The apparatus of claim 11, wherein the QoS scheduler block performs a scheduling process in which the MAC management message has a higher priority than the transport message.

13. The apparatus of claim 11, wherein the QoS scheduler block classifies the MAC management message into one of a third QoS class including downlink and uplink MAP messages, a fourth QoS class including mobile traffic indication and mobile paging advertisement messages, a fifth QoS class including a basic message, a sixth QoS class including a primary message, and a seventh QoS class including a downlink channel descriptor, an uplink channel descriptor and mobile neighbor advertisement messages, according to a scheduling priority.

14. The apparatus of claim 13, wherein the seventh QoS class includes broadcast messages from which the messages of the third and fourth QoS classes are excluded.

15. The apparatus of claim 11, wherein the QoS scheduler block classifies the MAC management message into one of a eighth QoS class includes downlink and uplink MAP messages and a ninth QoS class including a mobile traffic indication message, a mobile paging advertisement message, a basic message, a primary message, a downlink channel descriptor message, an uplink channel descriptor message, and a mobile neighbor advertisement message, according to a scheduling priority.

16. The apparatus of claim 15, wherein the ninth QoS class including all broadcast messages from which the messages of the eighth QoS class are excluded.

17. The apparatus of claim 11, wherein the QoS scheduler block schedules the MAC management message in a First Input First Output (FIFO) scheme according to each QoS class.

18. The apparatus of claim 11, wherein the second QoS class is scheduled by:

$$P_k(n) = r_k(n)/T_k(n) \times p_{connection},$$

where k is a user index, n is a time frame index, $r_k(n)$ is a Modulation order Product Rate (MPR), $p_{connection}$ is a relative priority of each connection, and $T_k(n)$ is an average throughput up to an n time frame.

19. The apparatus of claim 11, wherein the QoS RF scheduler performs a scheduling process in which data to be retransmitted has a higher priority than data to be initially transmitted when an automatic retransmission scheme is applied in a scheduling time.

20. The apparatus of claim 19, wherein the QoS RF scheduler performs the scheduling process in which the data to be initially transmitted has a higher priority than the data to be retransmitted when the data to be initially transmitted is one of a mobile traffic indication message and a mobile paging advertisement message.

21. A method for scheduling data in a communication system, the method comprising the steps of:
classifying the data into a Medium Access Control (MAC) management message and a transport message according to a Connection Identifier (CID) of the data;
classifying each of the MAC management message and the transport message into at least one Quality of Service (QoS) class having a series of priorities according to a QoS; and
scheduling the at least one QoS class according to the series of priorities,
wherein the transport message is classified into one of a first QoS class including an unsolicited granted service, real-time polling service, and an extended real-time polling service, or a second QoS class including a non-real-time polling service and best effort service, and
wherein the second QoS class is scheduled by:

$$P_k(n) = r_k(n)/T_k(n) \times p_{connection},$$

where k is a user index, n is a time frame index, $r_k(n)$ is a Modulation order Product Rate (MPR), $p_{connection}$ is a relative priority of each connection, and $T_k(n)$ is an average throughput up to an n time frame.

22. An apparatus for scheduling data in a communication system, the apparatus comprising:
a Quality of Service (QoS) Radio Frequency scheduler; and
a QoS scheduler block,
wherein the data is classified into a Medium Access Control (MAC) management message and a transport message according to a Connection Identifier (CID) of the data;
each of the MAC management message and the transport message is classified into at least one QoS class having a series of priorities according to a QoS; and
the at least one QoS class is scheduled according to the series of priorities, and
wherein the transport message is classified into one of a first QoS class including an unsolicited granted service, real-time polling service, and an extended real-time polling service, or a second QoS class including a non-real-time polling service and best effort service,
with the second QoS class scheduled by:

$$P_k(n) = r_k(n)/T_k(n) \times p_{connection},$$

where k is a user index, n is a time frame index, $r_k(n)$ is a Modulation order Product Rate (MPR), $p_{connection}$ is a relative priority of each connection, and $T_k(n)$ is an average throughput up to an n time frame.

* * * * *

UNITED STATES PATENT AND TRADEMARK OFFICE
CERTIFICATE OF CORRECTION

PATENT NO.       : 7,633,863 B2                                      Page 1 of 1
APPLICATION NO.  : 11/489015
DATED            : December 15, 2009
INVENTOR(S)      : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 596 days.

Signed and Sealed this

Twenty-first Day of December, 2010

David J. Kappos
*Director of the United States Patent and Trademark Office*